(12) United States Patent
Kim et al.

(10) Patent No.: US 10,798,222 B2
(45) Date of Patent: Oct. 6, 2020

(54) APPARATUS FOR MANAGING SDN-BASED IN-VEHICLE NETWORK AND CONTROL METHOD THEREOF

(71) Applicants: HYUNDAI MOTOR COMPANY, Seoul (KR); KIA MOTORS CORPORATION, Seoul (KR); KOREA POLYTECHNIC UNIVERSITY Industry Academic Cooperation Foundation, Siheung-si, Gyeonggi-do (KR)

(72) Inventors: Seung Su Kim, Seoul (KR); Pil Yong Park, Seoul (KR); Jeong Hwan Kim, Seoul (KR); Jin Hyuk Jung, Seoul (KR); Suk Hyun Seo, Suwon-si (KR); Sang Hyun Han, Cheonan-si (KR)

(73) Assignees: HYUNDAI MOTOR COMPANY, Seoul (KR); KIA MOTORS CORPORATION, Seoul (KR); KOREA POLYTECHNIC UNIVERSITY INDUSTRY ACADEMIC COOPERATION FOUNDATION, Siheung-si, Gyeonggi-Do (KR)

( * ) Notice: Subject to any disclaimer, the term of this patent is extended or adjusted under 35 U.S.C. 154(b) by 0 days.

(21) Appl. No.: 16/208,812

(22) Filed: Dec. 4, 2018

(65) Prior Publication Data

US 2019/0394305 A1    Dec. 26, 2019

(30) Foreign Application Priority Data

Jun. 25, 2018    (KR) .................... 10-2018-0072817

(51) Int. Cl.
*H04L 29/06*    (2006.01)
*H04L 12/24*    (2006.01)
(Continued)

(52) U.S. Cl.
CPC .............. *H04L 69/08* (2013.01); *H04L 12/40* (2013.01); *H04L 12/4641* (2013.01);
(Continued)

(58) Field of Classification Search
CPC ..... H04L 41/0893; H04L 69/08; H04L 12/40; H04L 2012/40215; H04L 12/4641; H04L 67/12
See application file for complete search history.

(56) References Cited

U.S. PATENT DOCUMENTS 9,660,877 B1 * 5/2017 Kanekar ................. H04L 41/50
9,667,524 B2   5/2017 Gorkemli et al.
(Continued)

FOREIGN PATENT DOCUMENTS

KR    10-2015-0012755 A    2/2015
KR        10-1527786 B1    6/2015
(Continued)

*Primary Examiner* — Abdullahi E Salad
(74) *Attorney, Agent, or Firm* — Brinks Gilson & Lione

(57) ABSTRACT

A software defined network (SDN)-based network management apparatus includes: an SDN controller including a first management unit to store a plurality of heterogeneous protocol information items, and an SDN switch controlled by the SDN controller and including a second management unit to store at least one heterogeneous protocol information item acquired from the SDN controller and a gateway to communicate with a vehicle network. In particular, upon receiving a packet corresponding to a new protocol that has not been used for access, from an external source, the SDN switch sends a request to the SDN controller for analysis of the received packet, and the SDN controller forwards protocol information corresponding to the received packet among the plurality of heterogeneous information items stored in the first management unit, to the SDN switch.

17 Claims, 5 Drawing Sheets

(51) Int. Cl.
*H04L 29/08* (2006.01)
*H04L 12/46* (2006.01)
*H04L 12/40* (2006.01)

(52) U.S. Cl.
CPC .......... *H04L 41/0893* (2013.01); *H04L 67/12* (2013.01); *H04L 2012/40215* (2013.01)

(56) References Cited

U.S. PATENT DOCUMENTS

| | | |
|---|---|---|
| 9,729,424 B2 | 8/2017 | Yin et al. |
| 2015/0117451 A1* | 4/2015 | Kaneriya ............... H04L 45/745 370/392 |
| 2016/0205071 A1* | 7/2016 | Cooper ............... H04L 12/6418 726/1 |
| 2016/0359721 A1* | 12/2016 | Hu ......................... H04L 41/12 |
| 2016/0373996 A1* | 12/2016 | Yang ................... H04L 12/5691 |
| 2017/0005910 A1* | 1/2017 | Sebastian ................ H04L 45/12 |
| 2017/0006067 A1* | 1/2017 | Narain ................ H04L 41/0823 |
| 2017/0149632 A1* | 5/2017 | Saltsidis ............. H04L 41/0668 |
| 2017/0346716 A1* | 11/2017 | Zheng .................... H04L 45/38 |
| 2018/0146075 A1* | 5/2018 | Lee ........................ H04L 69/22 |
| 2018/0159790 A1* | 6/2018 | Wang ................. H04L 47/6215 |
| 2018/0167282 A1* | 6/2018 | Reumann ............. H04L 41/12 |
| 2019/0097927 A1* | 3/2019 | An .......................... H04L 45/64 |

FOREIGN PATENT DOCUMENTS

| | | |
|---|---|---|
| KR | 10-1700238 B1 | 1/2017 |
| KR | 10-2017-0023493 A | 3/2017 |
| KR | 10-1740456 B1 | 5/2017 |

\* cited by examiner

APPARATUS FOR MANAGING SDN-BASED IN-VEHICLE NETWORK AND CONTROL METHOD THEREOF

This application claims priority to and the benefit of Korean Patent Application No. 10-2018-0072817, filed on Jun. 25, 2018, the entire contents of which are incorporated herein by reference.

FIELD

The present disclosure relates to a network management apparatus and a control method thereof, for further effective communication in a software defined network (SDN)-based in-vehicle network.

BACKGROUND

The statements in this section merely provide background information related to the present disclosure and may not constitute prior art.

A conventional vehicle uses only a limited type of vehicle network protocol. However, along with the development of communication technologies, wired and wireless network environments have been increasingly diversified and complicated and communication with various devices is performed in a vehicular environment and, thus, there has been an earnest need to support connectivity for a wider variety of protocols.

For example, only a protocol such as CAN, CAN-FD, Flexray, and LIN is conventionally used in a vehicle but, currently, it is desired to also support communication including TCP/IP-based communication. When such heterogeneous networks are embodied, it is possible to acquire in-vehicle information or to also control device included in the vehicle through access to an external program.

However, to support such heterogeneous networks, a vehicle side needs to support an external protocol or an external device that attempts to access the external protocol needs to support a vehicular protocol. To this end, according to the prior art, a separate gateway for enabling protocol conversion between heterogeneous networks is used, but we have discovered that such a method has a difficulty in responding to attempt of access through a protocol that is not already supported by a gateway.

SUMMARY

The present disclosure provides a network management apparatus and a control method thereof, for further effectively supporting communication between heterogeneous networks in a vehicular environment.

In particular, the present disclosure provides a network management apparatus and a control method thereof, for effectively responding to communication between various heterogeneous networks in a software defined network (SDN)-based in-vehicle network.

Additional advantages, objects, and features of the present disclosure will be set forth in part in the description which follows and in part will become apparent to those having ordinary skill in the art upon examination of the following or may be learned from practice of the present disclosure. The objectives and other advantages of the present disclosure may be realized and attained by the structure particularly pointed out in the written description and claims hereof as well as the appended drawings.

To achieve these objects and other advantages and in accordance with the purpose of the present disclosure, as embodied and broadly described herein, a control method of an apparatus for managing a software defined network (SDN)-based network includes: receiving a packet from an external source, by an SDN switch; determining whether the received packet is a packet corresponding to a new protocol that has not been used for access; when the received packet is the packet corresponding to the new protocol, sending, by the SDN switch, a request to an SDN controller configured to control the SDN switch for analysis of the received packet; analyzing, by the SDN controller, the received packet based on a plurality of heterogeneous protocol information items that are pre-stored in a first management unit; and forwarding protocol information corresponding to the received packet among the plurality of heterogeneous protocol information items, to the SDN switch.

In another aspect of the present disclosure, an apparatus for managing a software defined network (SDN)-based network includes: an SDN controller including a first management unit configured to store a plurality of heterogeneous protocol information items, and an SDN switch controlled by the SDN controller and including a second management unit configured to store at least one heterogeneous protocol information item acquired from the SDN controller and a gateway configured to communicate with a vehicle network. In particular, upon receiving a packet corresponding to a new protocol that has not been used for access, from an external source, the SDN switch is configured to send a request to the SDN controller for analysis of the received packet, and the SDN controller is configured to forward protocol information corresponding to the received packet among the plurality of heterogeneous information items stored in the first management unit, to the SDN switch.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
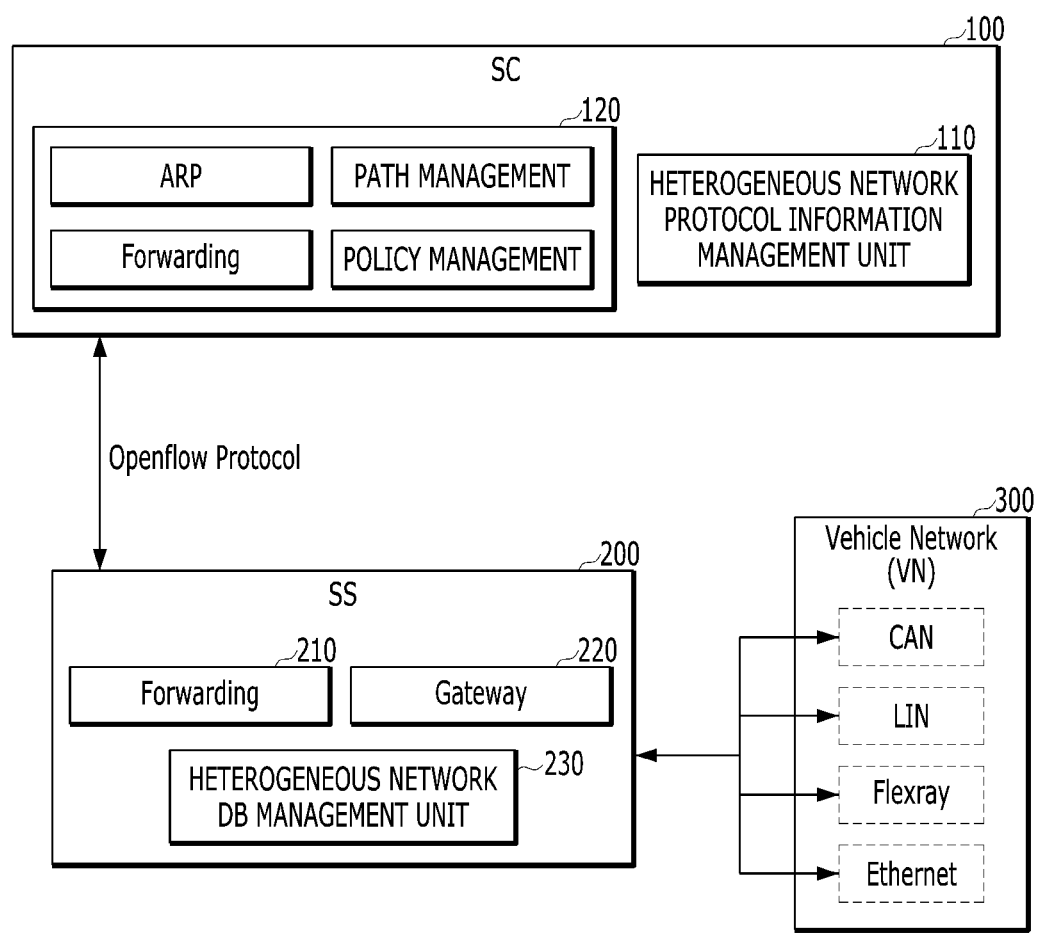
FIG. 1 is a block diagram showing an example of a configuration of a vehicle network.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Exemplary forms of the present disclosure are described in detail so as for those of ordinary skill in the art to easily implement the present disclosure with reference to the accompanying drawings. However, the present disclosure may be implemented in various different forms and is not limited to these forms. To clearly describe the present disclosure, a part that is not related to the description is omitted in the drawings, and like reference numerals in the specification denote like elements.

In the specification, when it is described that a certain part is "connected" to another part, it should be understood that the certain part may be directly connected to another part or electrically connected to another part via another part in the middle. In addition, when a certain part "includes" a certain component, this indicates that the part may further include another component instead of excluding another component unless there is no different disclosure.

Exemplary forms of the present disclosure propose that information of all heterogeneous network programs be prepared for a software defined network (SDN) controller (hereinafter referred to as "SC" for convenience) and information on a protocol that has been used for access be stored in an SDN switch (hereinafter, referred to as "SS"). In addition, exemplary forms of the present disclosure propose that, when there is an attempt to access a network through a new protocol that has not been used for access, the SS make a request to the SC for packet analysis to acquire information on a protocol corresponding to the corresponding packet from the SC and, when there is an attempt to access a network through a protocol that has been used for access, protocol information stored in the SS be used.

First, a configuration of a vehicle network according to forms of the present disclosure is described with reference to FIG. 1. FIG. 1 is a block diagram showing an example of a configuration of a vehicle network.

Referring to FIG. 1, the vehicle network may include: an SDN controller (SC) 100, an SDN switch (SS) 200, and a vehicle network (VN) 300. Hereinafter, each component is described in detail.

The SC 100 may perform overall management of an established network and may include a heterogeneous network protocol information management unit 110 and a controller 120. The controller 120 may include an address resolution protocol (ARP) unit, a path management unit, a policy management unit, a forwarding unit, and so on and may perform a basic function of an SDN controller, such as path search, path determination, policy management, and error management. Each function is the same as a function that is well known in the field of an SDN and, thus, a separate detailed description thereof is omitted.

The heterogeneous network protocol information management unit 110 according to one form of the present disclosure may store protocol information of another network such as Wi-Fi and ZigBee except for a protocol applied to a vehicle network such as CAN or LIN, in order to recognize the characteristics of a protocol and to bring desired information when a vehicle communicates with an external device.

Then, the SS 200 may be in charge of packet forwarding of a configured network and may include a forwarding unit 210 for performing a forwarding function, a gateway 220 for performing a gateway function, and a heterogeneous network database (DB) management unit 230. The heterogeneous network DB management unit 230 may store a DB value of a heterogeneous network (protocol), which is stored as a default (an initial value) or is acquired from the SC 100. For example, the DB value stored as a default may be in a state without any information or may have a minimum DB value of a protocol such as Ethernet. When requiring other network (protocol) information that is not stored in the heterogeneous network DB management unit 230, the SS 200 may bring information on the corresponding protocol from the heterogeneous network protocol information management unit 110 via communication with the SC 100 according to the OpenFlo protocol. The information on the heterogeneous protocol, which is acquired as described above, may be stored in the heterogeneous network DB management unit 230.

The VN 300 may refer to a network used in a vehicle, such as CAN, LIN, Flexray, or Ethernet, may include a backbone according to a specific protocol (e.g., Ethernet), and may communicate with the gateway 220 installed in the SS 200 according to an Ethernet protocol.

Accordingly, general communication between components in the VN 300 may be managed by the gateway 220 of the SS 200 and it may be desirable that the gateway 220 at least possess protocol information for interpreting or converting each protocol included in the VN 300. However, upon receiving a packet according to a protocol that is not stored in the gateway 220, the SS 200 may bring information on a protocol corresponding to the corresponding packet through the OpenFlow protocol with the SC 100, as described above. Heterogeneous (protocol) information that is stored once is stored in the heterogeneous network DB management unit 230 in the SS 200 and, thus, even if the same protocol as in the heterogeneous information desires communication, the heterogeneous information may be capable of being autonomously processed in the SS 200 without an additional request to the SC 100.

Hereinafter, a processing procedure of processing a packet according to a heterogeneous protocol upon receiving the packet under the network configuration described with reference to FIG. 1 is described with reference to FIG. 2.

Figure 2:
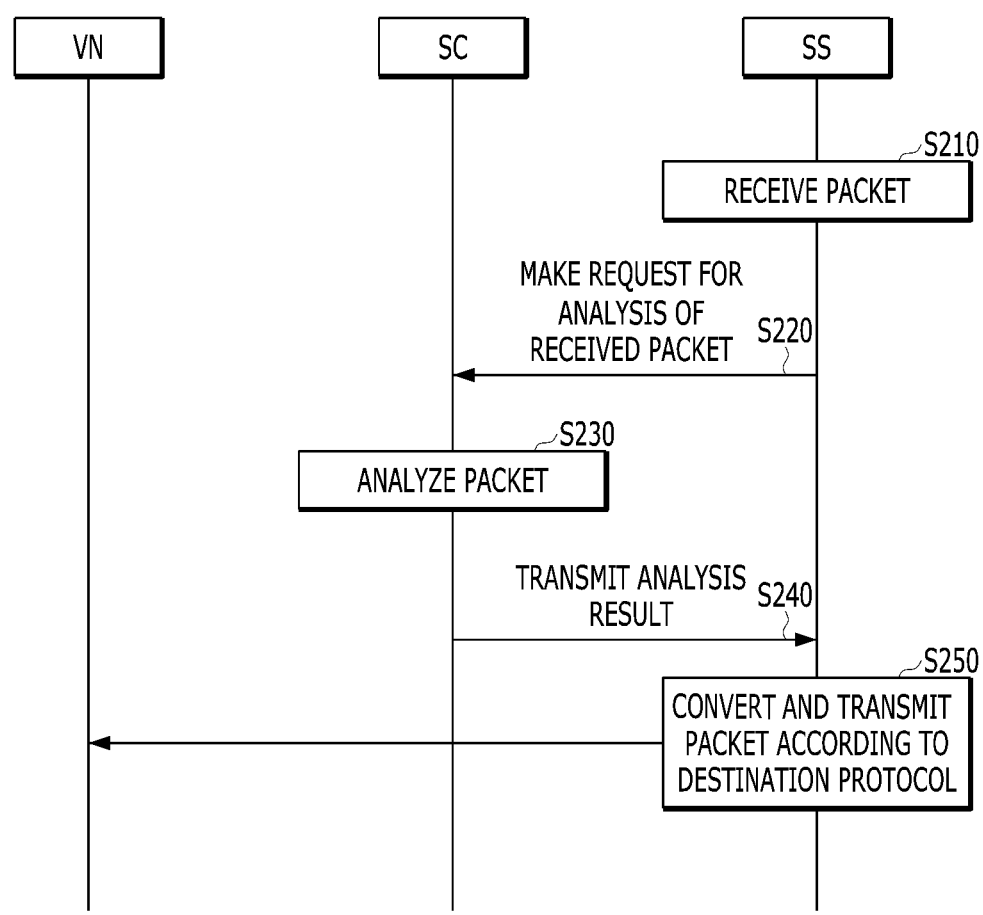
FIG. 2 is a diagram showing an example of a procedure of processing a packet according to a heterogeneous protocol.

FIG. 2 is a diagram showing an example of a procedure of processing a packet according to a heterogeneous protocol according to an exemplary form of the present disclosure.

Referring to FIG. 2, a packet may be received from an external source (S210). Accordingly, the SS 200 may verify whether information on a protocol of the corresponding packet is present in the gateway 220 or the heterogeneous network DB management unit 230 and, when the information is not present (i.e., when the packet is a packet transmitted from a heterogeneous network that has not been used for access), the SS 200 may transmit the corresponding packet to the SC 100 to make a request for packet analysis (S220).

The SC 100 may analyze and recognize a protocol of a corresponding packet (S230) and may transmit information on the analyzed protocol to the SS 200 (S240). The SS 200 may store information received from the SC 100 in the heterogeneous network DB management unit 230 and may determine a destination (i.e., any one of networks included in the VN) of a corresponding packet using the received information. Accordingly, the gateway 220 of the SS 200 may convert the packet according to a protocol (e.g., CAN) corresponding to the determined destination and, then, may forward the converted packet to the VN 300 (S250). On the other hand, after operation S210, when the information on the protocol of the corresponding packet is present in the gateway 220 or the heterogeneous network DB management unit 230, processing of the corresponding packet may proceed immediately to operation S250 with respect to the pre-present information on the protocol.

Figure 3:
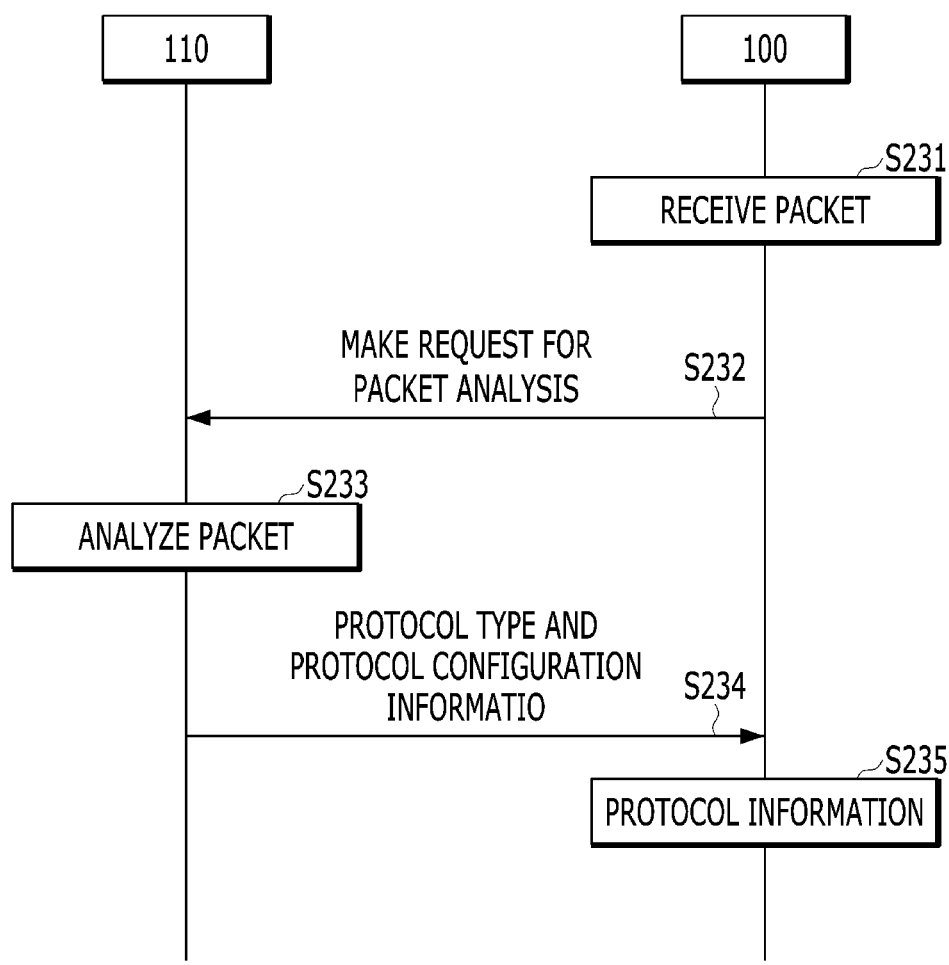
FIG. 3 is a diagram showing an example of a procedure of analyzing a packet by a software defined network (SDN) controller.

Hereinafter, a packet analysis procedure (i.e., operation S230 of FIG. 2) is described in more detail with reference to FIG. 3. FIG. 3 is a diagram showing an example of a procedure of analyzing a packet by an SDN controller in another form of the present disclosure.

Referring to FIG. 3, upon receiving a packet from the SS 200 (S231), the SC 100 may make a request to the heterogeneous network protocol information management unit 110 for packet analysis (S232) and, thus, the heterogeneous network protocol information management unit 110 may perform packet analysis (S233). In this case, a packet received from an external source may basically have a protocol type, information on a transmission position, information on a reception position (destination), and data. The heterogeneous network protocol information management unit 110 has information on all protocols and, thus, may recognize a type of a protocol corresponding to a corresponding packet to recognize components of the packet. The heterogeneous network protocol information management unit 110 may transmit protocol information indicating a position of a desired component in the corresponding packet, such as a protocol type, information on a transmission position, information on a reception position (destination), and data (payload), among the recognized components, to the SC 100 in response to the request of the SC 100 (S234) and the SC 100 may prepare to transmit the information to the SS 200 (S235). Here, the protocol information may have a table form without being limited thereto.

Figure 4:
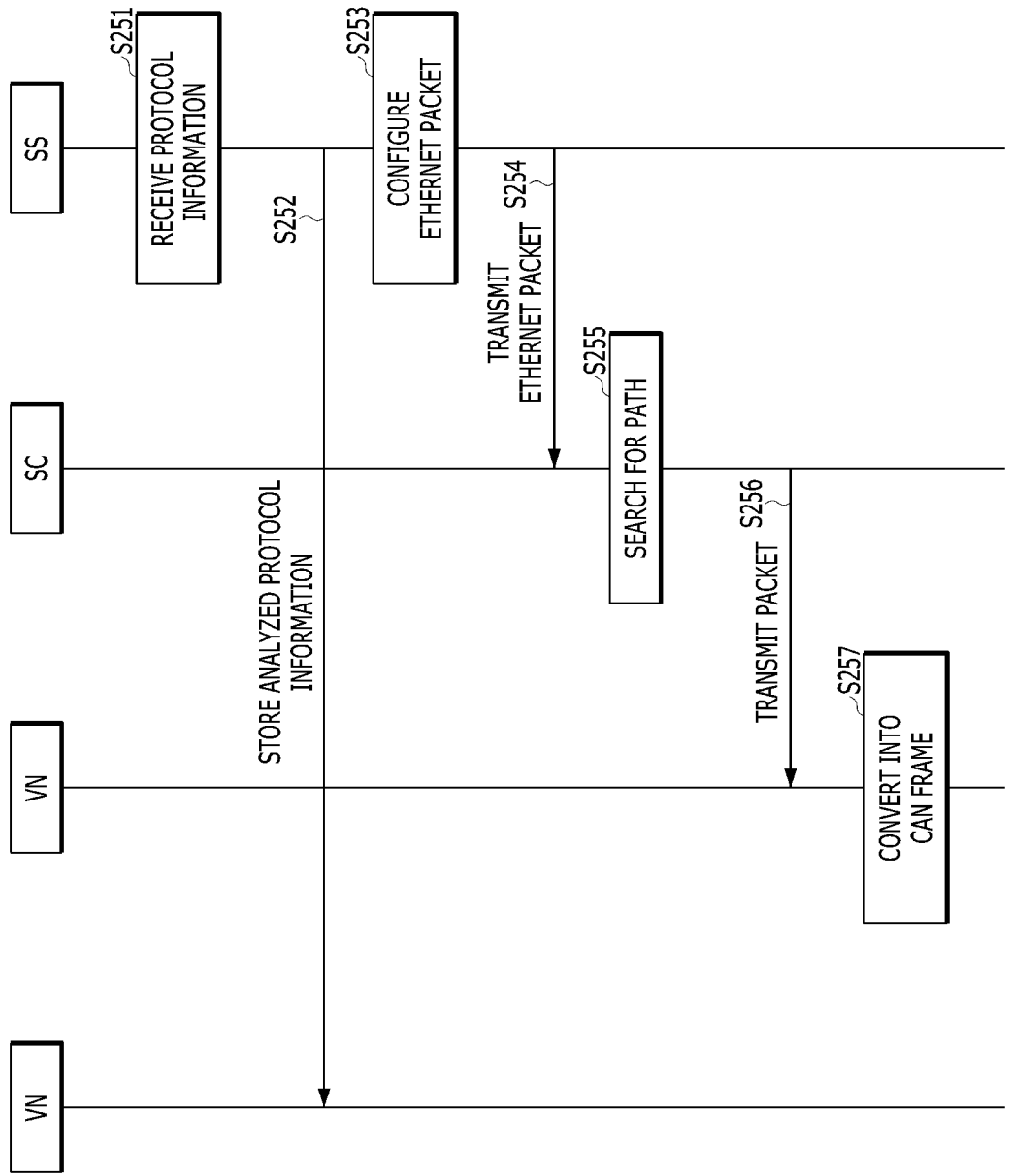
FIG. 4 is a diagram showing an example of a procedure of analyzing and converting a packet and performing forwarding by an SDN switch.

Hereinafter, the protocol converting and forwarding procedure (i.e., operation S250 of FIG. 2) is described in more detail with reference to FIG. 4. FIG. 4 is a diagram showing an example of a procedure of analyzing and converting a packet and performing forwarding by an SDN switch according to another exemplary form of the present disclosure.

Referring to FIG. 4, the SS 200 may receive protocol information including information on a protocol type and components of the protocol from the SC 100 (S251) and may store the protocol information in the heterogeneous network DB management unit 230 (S252). Then, according to the stored information (e.g., a table), a heterogeneous protocol packet may be converted into an Ethernet packet (S253) and may be forwarded to the forwarding unit 210. The forwarding unit 210 may search for a path based on positional information included in the Ethernet packet (S255) and may forward the packet to the gateway 220 according the search result (S256). The gateway 220 may convert the received Ethernet packet into a packet (e.g., a CAN frame in the case in which a reception position is a CAN network of a VN) of a protocol corresponding to a position for re-reception (e.g., a change in a CAN message identifier (ID)) and may transmit the converted packet to a network corresponding to the reception position of the VN (S257).

Figure 5:
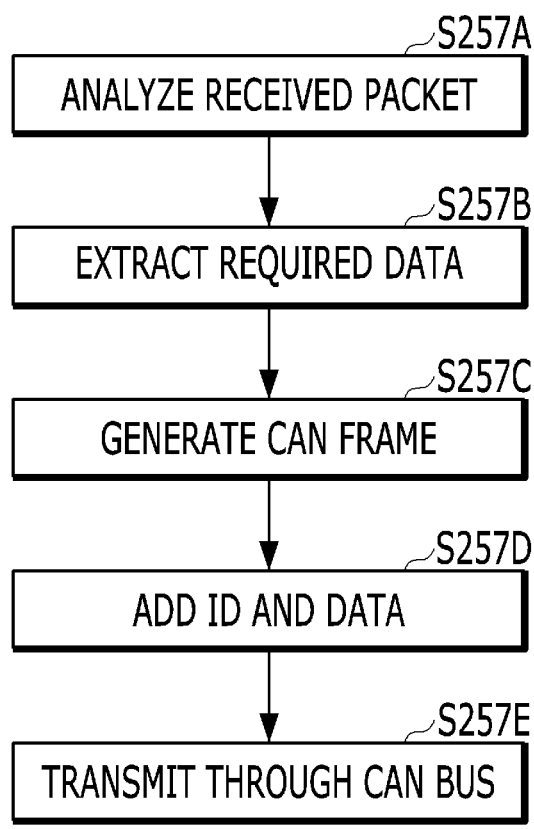
FIG. 5 is a diagram showing an example of a procedure of converting a packet by a gateway of an SDN switch.

Hereinafter, the protocol conversion procedure (i.e., operation S257 of FIG. 4) is described in more detail with reference to FIG. 5. FIG. 5 is a diagram showing an example of a procedure of converting a packet by a gateway of an SDN switch in one form of the present disclosure. In FIG. 5, positional information of reception of a heterogeneous network packet is assumed to correspond to a CAN network.

Referring to FIG. 5, the gateway 220 may analyze the received Ethernet packet (S257A) and may extract information desired for packet conversion (S257B). Here, the information desired for packet conversion may include ID, data, or the like without being limited thereto. The gateway 220 may generate a CAN frame (S257C) and may add the information such as ID or data to the generated CAN frame using the extracted information (S257D). Then, the gateway 220 may transmit the generated CAN frame through a CAN bus in such a way that an MCU receives the CAN frame (S257E).

In the aforementioned form, it may be desirable that the heterogeneous network protocol information management unit 110 in the SC 100 possess information on all protocols, to be received by the SS 200. It may be desirable that communication between the SS 200 and the SC 100 use the standard Open API and OpenFlow Protocol.

It may be desirable that the gateway 220 in the SS 200 possess both information on a protocol for configuration of the VN 300 and information on an Ethernet packet. As such, the gateway 220 may extract desired information from the Ethernet packet generated by the SS 200 to reconfigure a packet according to a frame corresponding to a reception position among protocols for configuration of the VN 300.

It may be desirable that all components of a network according to exemplary forms of the present disclosure be based on a configuration of an SDN and that the SS 200 use a white box and load and use a predetermined operating system (OS). However, the SC 100 may be appropriately configured according to a user environment. The SS 200 may be controlled by the SC 100 and, in this regard, when a space for storing protocol information on a protocol that has not been used for access from the SC 100 is insufficient, the SC 100 may dynamically correct the protocol information or may indirectly transmit a packet.

According to the aforementioned exemplary forms of the present disclosure, a vehicle may convert and transmit a packet to enable communication between in-vehicle networks irrespective of a protocol of an external device. Accordingly, an in-vehicle function may be controlled via access to an external protocol. For example, to externally recognize information on an in-vehicle CAN network via Wi-Fi, communication between heterogeneous networks may be performed via the aforementioned procedure. Needless to say, in the case of a heterogeneous protocol that has been previously used for access, protocol information is already stored in the SS 200 and, thus, even if the SS 200 does not re-make a request to the SC 100 for packet analysis, the SS 200 may autonomously perform forwarding via determination and conversion of a path of a heterogeneous protocol packet.

According to the at least one form of the present disclosure as described above, communication between heterogeneous networks may be further effectively supported in a vehicular environment.

In particular, when access is attempted through a new protocol that has not been used for access in a software defined network (SDN)-based in-vehicle network, information on the corresponding protocol may be acquired and, when a corresponding protocol has been pre-used for access, it may be effective that pre-stored protocol information is used.

It will be appreciated by persons skilled in the art that that the effects that could be achieved with the present disclosure are not limited to what has been particularly described hereinabove and other advantages of the present disclosure will be more clearly understood from the above detailed description taken in conjunction with the accompanying drawings.

The aforementioned present disclosure can also be embodied as computer readable code stored on a computer readable recording medium. The computer readable recording medium is any data storage device that can store data which can thereafter be read by a computer. Examples of the computer readable recording medium include a hard disk drive (HDD), a solid state drive (SSD), a silicon disk drive (SDD), read-only memory (ROM), random-access memory (RAM), CD-ROM, magnetic tapes, floppy disks, optical data storage devices, carrier waves (e.g., transmission via the Internet), etc.

It will be apparent to those skilled in the art that various modifications and variations can be made in the present disclosure without departing from the spirit or scope of the present disclosure. Thus, it is intended that the present disclosure cover the modifications and variations of this present disclosure.

What is claimed is:

1. A control method of an apparatus for managing a software defined network (SDN)-based network, the method comprising:
    receiving a packet from an external source, by an SDN switch;
    determining, by the SDN switch, whether the received packet is a packet corresponding to a new protocol that has not been used for access;
    when the received packet is the packet corresponding to the new protocol, sending, by the SDN switch, a request to an SDN controller configured to control the SDN switch for analysis of the received packet;
    analyzing, by the SDN controller, the received packet based on a plurality of heterogeneous protocol information items that are pre-stored in a first management unit;
    forwarding protocol information corresponding to the received packet among the plurality of heterogeneous protocol information items, to the SDN switch; and
    converting the received packet into a first frame based on a preset first protocol using the received protocol information and forwarding the first frame to a gateway in the SDN switch, by the SDN switch.

2. The method of claim 1, further comprising: storing the received protocol information in a second management unit, by the SDN switch.

3. The method of claim 2, wherein:
    the gateway is connected to a vehicle network;
    the vehicle network includes a network according to at least one vehicular communication protocol; and
    the gateway possesses information on each of the at least one vehicular communication protocol.

4. The method of claim 3, further comprising:
    extracting a message identifier and data from the first frame, by the gateway; and
    generating a second frame based on a second protocol corresponding to a network corresponding to a reception position of the received packet among networks according to the at least one vehicular communication protocol, by the gateway.

5. The method of claim 4, further comprising: transmitting the generated second frame to the network corresponding to the reception position of the received packet, by the gateway.

6. The method of claim 1, wherein the protocol information corresponding to the received packet includes at least one of a protocol type, a transmission position, a reception position, or data of the received packet.

7. The method of claim 3, wherein determining whether the received packet is a packet corresponding to the new protocol is based on at least one of protocol information stored in the gateway or the second management unit.

8. The method of claim 7, wherein, when the received packet is a packet corresponding to a protocol that has been used for access, the received packet is converted and is transmitted to the vehicle network using at least one of the protocol information stored in the gateway or the second management unit.

9. A non-transitory computer readable recording medium having recorded thereon a program for executing the control method of the network management apparatus of claim 1.

10. An apparatus for managing a software defined network (SDN)-based network, the apparatus comprising:
    an SDN controller including a processor and a first management unit configured to store a plurality of heterogeneous protocol information items; and
    an SDN switch controlled by the SDN controller and including a second management unit configured to store at least one heterogeneous protocol information item acquired from the SDN controller and a gateway configured to communicate with a vehicle network,
    wherein:
    upon receiving a packet corresponding to a new protocol that has not been used for access, from an external source, the SDN switch is configured to send a request to the SDN controller for analysis of the received packet;
    the SDN controller is configured to forward protocol information corresponding to the received packet among the plurality of heterogeneous information items stored in the first management unit, to the SDN switch; and
    the SDN switch is configured to convert the received packet into a first frame according to a preset first protocol using the received protocol information and forward the first frame to the gateway.

11. The apparatus of claim 10, wherein the SDN switch is configured to store the received protocol information in the second management unit.

12. The apparatus of claim 11, wherein:
    the vehicle network includes a network according to at least one vehicular communication protocol; and
    the gateway is configured to possess information on each of the at least one vehicular communication protocol.

13. The apparatus of claim 12, wherein the gateway is configured to extract a message identifier and data from the first frame and generate a second frame based on a second protocol corresponding to a network corresponding to a reception position of the received packet among networks according to the at least one vehicular communication protocol.

14. The apparatus of claim 13, wherein the gateway is configured to transmit the generated second frame to a network corresponding to the reception position of the received packet.

15. The apparatus of claim 10, wherein the protocol information corresponding to the received packet includes at least one of a protocol type, a transmission position, a reception position, or data of the received packet.

16. The apparatus of claim 10, wherein the SDN switch is configured to determine whether the received packet is a packet corresponding to the new protocol that has not been used for access based on at least one of protocol information stored in the gateway and the second management unit.

17. The apparatus of claim 16, wherein, when the received packet corresponds to a protocol that has been used for access, the SDN switch is configured to transmit the received packet to the vehicle network using at least one of the protocol information stored in the gateway or the second management unit.

* * * * *